United States Patent
Okuta

(10) Patent No.: US 6,992,825 B2
(45) Date of Patent: Jan. 31, 2006

(54) VOLUME PHASE GRATING, A METHOD FOR PRODUCING SUCH A VOLUME PHASE GRATING, AN OPTICAL MODULE AND A SEMICONDUCTOR LASER MODULE USING SUCH A VOLUME PHASE GRATING

(75) Inventor: Michitaka Okuta, Yokohama (JP)

(73) Assignee: Kyocera Corporation, Kyoto (JP)

( * ) Notice: Subject to any disclaimer, the term of this patent is extended or adjusted under 35 U.S.C. 154(b) by 40 days.

(21) Appl. No.: 10/746,531

(22) Filed: Dec. 24, 2003

(65) Prior Publication Data

US 2004/0141235 A1    Jul. 22, 2004

(30) Foreign Application Priority Data

Dec. 26, 2002    (JP)    .............................. 2002-377393

(51) Int. Cl.
*G02B 5/18*    (2006.01)
(52) U.S. Cl. .................. 359/569; 359/566; 385/37; 385/24

(58) Field of Classification Search ................ 359/569, 359/572, 566, 1, 15; 430/1, 2; 385/37, 24
See application file for complete search history.

(56) References Cited

U.S. PATENT DOCUMENTS 4,714,902 A * 12/1987 Rokni et al. ................. 359/244
2002/0045104 A1 * 4/2002 Efimov et al. ................. 430/2

FOREIGN PATENT DOCUMENTS

JP        H09-283847        10/1997

* cited by examiner

*Primary Examiner*—Fayez G. Assaf
(74) *Attorney, Agent, or Firm*—Hogan & Hartson LLP

(57) ABSTRACT

In a volume phase grating, a plurality of phase gratings for causing a refractive index of a substrate having an incident surface and a launched surface facing each other to be cyclically changed between the incident surface and the launched surface are so formed as to be inclined at a specified angle to the incident surface. The volume phase grating is constructed such that an incident light is caused to be obliquely incident on the incident surface, and an angle of inclination of the phase gratings to the incident surface is set such that the incident light obliquely incident on the incident surface is refracted at the incident surface and perpendicularly incident on the phase gratings.

15 Claims, 8 Drawing Sheets

VOLUME PHASE GRATING, A METHOD FOR PRODUCING SUCH A VOLUME PHASE GRATING, AN OPTICAL MODULE AND A SEMICONDUCTOR LASER MODULE USING SUCH A VOLUME PHASE GRATING

BACKGROUND OF THE INVENTION

The present invention relates to a volume phase grating using Bragg reflection of returning, out of an incident light, only rays of a specified wavelength to an incident-light side by reflecting them, a method for producing such a volume phase grating, and an optical module and a semiconductor laser module using such a volume phase grating.

A Fiber Bragg Grating (abbreviated as FBG) has been known as a means for returning, out of an incident light, only rays of a specified wavelength to an incident-light side in an optical fiber. The FBG is such that refractive index is cyclically changed along longitudinal direction (optic-axis direction) in a fiber core 124 as shown in FIG. 12. This FBG can be produced by projecting a recording light 130 having a wavelength λuv in an ultraviolet range to an optical fiber 110 via a phase mask 136 having a mask interval Λ (mask) and forming phase gratings 120 for causing the refractive index to be cyclically changed along the longitudinal direction in the fiber core 124 by a photoinduced refractive index change for transferring and forming an intensity modulation area onto the optical fiber 110 by the interference of diffracted rays 125 of ± first order from the phase mask 136. A grating interval Λ(FBG) determining a refractive index changing cycle in the FBG satisfies the following relationship:

Λ(mask)=2×Λ(FBG).

The properties of the thus produced FBG 114 are determined by a change of the refractive index, the grating cyclic interval Λ(FBG) and a length of the FBG 114 along optic-axis direction. The change of the refractive index and the length of the FBG influence a reflectance and a band width, whereas the grating cyclic interval Λ(FBG) influences a center wavelength. A center wavelength λb of the reflection by the FBG 114 where the grating cyclic interval Λ(FBG) is constant with respect to the longitudinal direction of the optical fiber 110 is given by:

λb=2×n×Λ(FBG)

where n: effective refractive index of the fiber core.

If the FBG 114 is constructed at an output-side end 117 of a semiconductor laser module 116 and is coupled via coupling lenses 117 and a part (about several to 10%) of a light emitted from a semiconductor laser diode 112 is returned to the semiconductor laser diode 112 as shown in FIG. 11, thereby letting the FBG 114 function as an external resonator, an output-wavelength spectrum characteristic of the semiconductor laser diode 112 can be modified to have a narrower range and can be stabilized. Further, an emission spectrum characteristic of the semiconductor laser diode 112 substantially coincides with the reflection center wavelength λb of the FBG 114 as an external resonator. Further, the output-wavelength spectrum characteristic and the output characteristic in relation to a temperature change can be stabilized (see Japanese Unexamined Patent Publication No. H09-283847).

There is also known a volume phase grating in which phase gratings are formed in a SiO₂ or a glass material to provide a cyclical change of the refractive index instead of being formed in the FBG 114 forming reflecting diodes in the form of phase gratings in the optical fiber 110. This volume phase grating is called a Volume Bragg Grating, (abbreviated as VBG), particularly in the case of being used such that the diffracting direction of launching angle of the diffracted rays of ± first order coincide with the angular direction of the reflected lights.

FIG. 10A shows a method for forming the volume phase grating. More specifically, recording lights 130 are projected for exposure for about 5 to 30 min. to an outer surface 122 of a phase grating substrate 103 made of an induced refractive index medium (additive such as silver is added to an oxidized glass such as a SiO₂ base) having the upper and lower surfaces thereof optically polished and having a thickness D with the lengths of optical paths from unillustrated beam splitters to the outer surface 122 of the phase grating substrate 103 precisely coincided. An exposure time changes depending on the material of the phase grating substrate 103 used. A grating cyclic interval P1 can be arbitrarily set by adjusting an angle θ0 of the recording lights 130 to the phase grating substrate 103.

The recording light 130 to be projected to the substrate 130 is such that a recording light having coherence and a wavelength of λuv (e.g. a light having a wavelength of 458 to 528 nm in the ultraviolet range and emitted from an argon laser) is split halfway into two, for example, by means of a beam splitter and the respective resulting lights are converged once by a lens and made into a parallel light after being passed through a pinhole (diameter: 5 to 25 μm) provided at a focusing position in order to eliminate unnecessary diffracted rays.

If it is assumed that the wavelength of the recording light 130 is λuv and the angle thereof to the substrate 130 is θ0, the following relationship holds in accordance with the Snell law of refraction:

n0×sin θ0=n1×sin θ2.

If a refractive index n0 of air is 1, an angle θ2 in the substrate 130 is:

θ2=sin⁻¹{sin θ0/n1} where n1: refractive index of the phase grating substrate 103 and n0: refractive index of air (=1).

Further, a wavelength λm in the phase grating substrate 103 having a refractive index of n1 at the wavelength λuv is given as follows because a light velocity Cm in the phase grating substrate 103 is 1/n1 (frequency f is constant) of a light velocity Cuv in the air:

Cm=Cuv/n1.

From Cm=f×λm, Cuv=f×λuv,

λm=λuv/n1.

If two lights of plane waves having an amplitude A at the wavelength λm intersect in the phase grating substrate 103 having the refractive index of n1, the grating cyclic interval P1 of the phase gratings 120 is determined by a place where a combined amplitude of the respective plane waves becomes 0 due to the above interference, and the phase gratings 120 become a group of straight lines defined by:

2A×[cos{(2×π×Y×sin θ2)/λm}]=0 where A: amplitude of the respective plane waves, Y: position on Y-axis, and Y(k)={(2×k+1)×λm}/(4×sin θ2) (k: arbitrary integer).

Therefore, the grating cyclic interval P1 of the respective phase gratings is given by:

$P1 = Y(k+1) - Y(k)$ $P1 = \lambda m / \{2 \times \sin \theta 2\}$.

Specifically, lines of the specified cycle defined by the above equation are exposed. If the phase grating substrate 103 having the recording lights 130 projected thereto for exposure is left in a high-temperature environment of about 500° C. for several hours, a refractive index changing area where the refractive index cyclically changes appears in the phase grating substrate 103. A change Δn of the refractive index is about 0.01 to 0.001.

Thereafter, the phase grating substrate 103 is vertically so cut between the upper and lower surfaces as to have a width T as shown in FIG. 10B, whereby a plurality of volume phase gratings 137 having a height of D mm and a width of T mm as shown in FIG. 10C can be obtained. AR coatings (anti-reflection coatings) made of dielectric multi-layer films are applied to incident surfaces 121 obtained by optically polishing cut surfaces 126 in order to prevent reflection at the incident surfaces 121.

Incident lights 118 having wavelengths λa, λb and satisfying Bragg condition are caused to fall on the volume phase grating 137 obtained by the above process as shown in FIG. 10C, only the light having the wavelength of λb is reflected and the light having the wavelength of λa undergoes an end-face reflection (indicated by arrows 127).

Although not shown, if the light is obliquely incident at an angle of α, the diffracting direction and the angle of reflection coincide with respect to the formed phase grating surfaces, thereby satisfying the Bragg diffraction condition. The diffraction efficiency depends on the cutting width T (number of the phase gratings 20). If the light having a wavelength different from that of the Bragg diffraction condition is incident or the light is incident at an angle different from the Bragg diffraction condition, the diffraction efficiency is reduced and a launching angle of the diffracted rays changes.

However, the conventional construction example using the phase gratings having the above properties has the following problems. Specifically, if the FBG 114 is constructed at the output-side end 117 of the semiconductor laser diode 112 in the semiconductor laser module 116 as shown in FIG. 11, when lights having wavelengths other than that of the light emitted from the semiconductor laser diode 112, particularly lights having wavelengths near the oscillating wavelength of the semiconductor laser diode 112 directly enter the semiconductor laser diode 112, the oscillating wavelength becomes unstable due to the influence of such lights, thereby making the output-wavelength spectrum characteristic and the output characteristic unstable.

In order to eliminate such an influence, an optical isolator for eliminating such lights may be mounted at an output side of the semiconductor laser diode 112. However, in the case of mounting the optical isolator (not shown), a necessary reflected light 119 from the FBG 114 functioning as an external resonator is cut off before reaching the semiconductor laser diode 112. Thus, the FBG 114 cannot function as an external resonator.

Such unnecessary lights may be removed if an inline type optical isolator (not shown) is mounted at an output side of the FBG 114. However, this results in a higher cost and the semiconductor laser module becomes an assembly of a plurality of modules, thereby necessitating more space for parts. Further, an area of the FBG 114 in the output-side fiber end 117 is normally as long as about 10 mm. Thus, upon a large temperature change, the grating cyclic interval P1 itself changes due to a linear expansion. Therefore, the wavelength of the reflected light 119 changes, which results in a problem that the oscillating wavelength of the semiconductor laser diode 112 is changed.

In the case of the optical module or the semiconductor laser module using the conventional volume phase gratings 137, if the incident light 118 is caused to be perpendicularly incident on the volume phase gratings 137 as shown in FIG. 10C, the end-face reflection 127 occurs, although to a small extent, even when the AR coating is applied to the incident surface 121. Thus, unnecessary lights having the wavelength λa other than the one satisfying the specific Bragg condition are also reflected and returned to the semiconductor laser diode 112, thereby causing an unnecessary oscillation in the semiconductor laser diode 112. This disadvantageously makes the output-wavelength spectrum characteristic unstable.

SUMMARY OF THE INVENTION

In view of the above situation, an object of the present invention is to provide a volume phase grating, a method for producing such a volume phase grating, and an optical module and a semiconductor laser module using such a volume phase grating which can solve the problems residing in the prior art.

In order to accomplish the above object, a first aspect of the invention is direction to a volume phase grating comprising a substrate having an incident surface and a launched surface facing each other, and a plurality of phase gratings for causing a cyclic change of a refractive index between the incident surface and the launched surface, the phase gratings being so formed in the substrate as to be inclined at a specified angle to the incident surface.

With this construction, when an incident light is caused to be obliquely incident at a specified incident angle on the incident surface of the volume phase grating, the incident light refracted at the incident surface can be caused to be perpendicularly incident on the phase gratings. Thus, it is possible not only to reflect only rays having a necessary wavelength by the phase gratings and return them toward the incident side of the incident light, but also to prevent the rays undergone the end-face reflection at the incident surface from returning toward the incident side. Therefore, if a semiconductor laser module is constructed using this volume phase grating, the oscillating wavelength of a semiconductor laser diode can be stabilized.

A second aspect of the invention is directed to an optical module, comprising a volume phase grating including a substrate having an incident surface and a launched surface facing each other, and a plurality of phase gratings for causing a cyclic change of a refractive index between the incident surface and the launched surface, the phase gratings being so formed in the substrate as to be inclined at a specified angle to the incident surface; and an optical component optically coupled to the volume phase grating, wherein, in the volume phase grating, an angle of the phase gratings to the incident surface is set such that an incident light obliquely incident on the incident surface is refracted at the incident surface and perpendicularly incident on the phase gratings.

With this construction, when an incident light is caused to be obliquely incident at a specified incident angle on the incident surface of the volume phase grating, the incident light refracted at the incident surface can be caused to be perpendicularly incident on the phase gratings. Thus, such an optical module as to make it possible not only to reflect only rays having a necessary wavelength by the phase gratings and return them toward the incident side of the incident light, but also to prevent the rays undergone the end-face reflection at the incident surface from returning toward the incident side can be easily obtained. Therefore, if a semiconductor laser module is constructed using this optical module, the emitting wavelength of a semiconductor laser diode can be stabilized.

A third aspect of the invention is directed to a semiconductor laser module, comprising an optical module using a volume phase grating including a substrate having an incident surface and a launched surface facing each other, and a plurality of phase gratings for causing a cyclic change of a refractive index between the incident surface and the launched surface, the phase gratings being so formed in the substrate as to be inclined at a specified angle to the incident surface; and a semiconductor laser diode arranged at an incident-surface side of the volume phase grating in the optical module.

With this construction, since it is possible not only to reflect only rays having a necessary wavelength by the phase gratings and return them toward the incident side of the incident light, but also to prevent the rays undergone the end-face reflection at the incident surface from returning toward the incident side, the emitting wavelength of the semiconductor laser diode can be stabilized and a semiconductor laser module having a good performance can be realized.

A fourth aspect of the invention is directed to a method for producing a volume phase grating comprising a substrate having an incident surface and a launched surface facing each other, and a plurality of phase gratings for causing a cyclic change of a refractive index between the incident surface and the launched surface, the phase gratings being so formed in the substrate as to be inclined at a specified angle to the incident surface, the method comprising a step of preparing a base substrate for forming a plurality of volume phase gratings; and a step of projecting ultraviolet rays having coherence to an outer surface of the prepared base substrate in two directions having different incident angles, thereby forming a plurality of phase gratings inclined to a normal to the outer surface of the base substrate inside the base substrate.

With this method, a plurality of phase gratings inclined to the normal to the outer surface of the base substrate can be formed in the base substrate by projecting the ultraviolet rays to the outer surface of the base substrate in two directions having different incident angles. Thus, the volume phase grating for causing a cyclic change of the refractive index between the incident surface and the launched surface can be easily and securely produced.

These and other objects, features and advantages of the present invention will become more apparent upon reading the following detailed description along with the accompanying drawings.

DETAILED DESCRIPTION OF THE PREFERRED EMBODIMENTS OF THE INVENTION

Figure 1A:
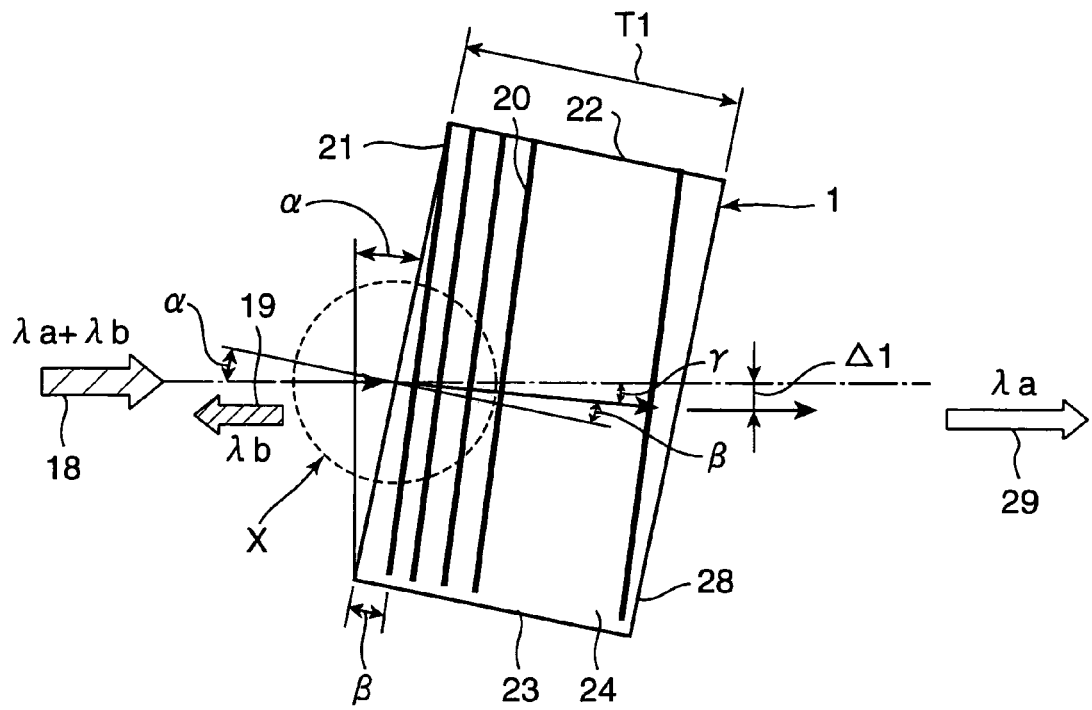
FIG. 1A is a section of a volume phase grating according to a first embodiment of the invention.
Figure 1B:
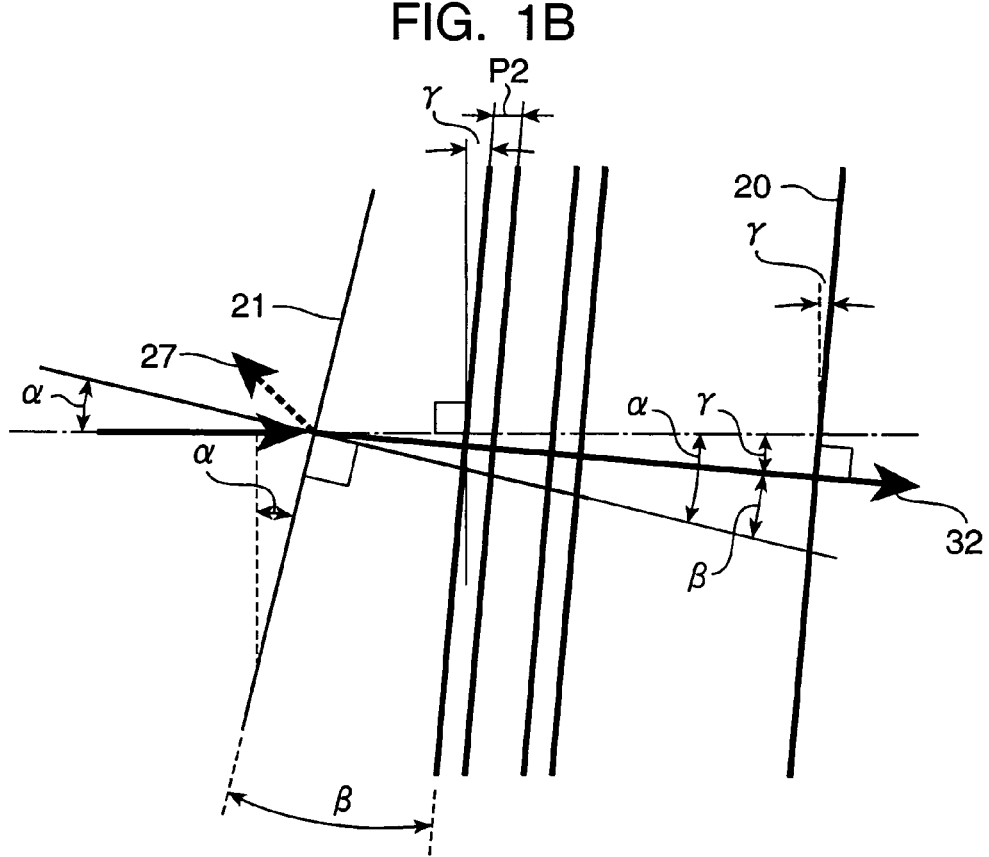
FIG. 1B is a detailed diagram enlargedly showing a portion X of the volume phase grating shown in FIG. 1A.

FIG. 1A shows a section of a volume phase grating 1 according to one embodiment of the invention and FIG. 1B schematically and enlargedly shows a portion X of FIG. 1A.

The volume phase grating 1 includes a substrate 24 having an incident surface 21 and a launched surface 28 facing each other in parallel and an upper surface (front surface) 22 and a lower surface (rear surface) 23 normal to these incident surface 21 and launched surface 28 and facing each other in parallel, and a plurality of phase gratings 20 for causing a cyclic change of the refractive index in a direction between the incident surface 21 and the launched surface 28 are formed in the substrate 24 while being inclined by an angle β to the incident surface 21. A grating interval P2 is set to reflect, out of an incident light 18, rays having a wavelength λb which satisfy the Bragg condition. The thus constructed volume phase grating 1 is inclined and the incident light 18 containing rays of wavelengths λa, λb is caused to be incident on the incident surface 21 at an angle α (angle α to a normal to the incident surface 21).

Here, the angle of inclination β of the phase gratings 20 to the incident surface 21 is set such that the incident light 18 incident on the incident surface 21 at the angle α is refracted at the incident surface 21 of the substrate 24 and perpendicularly incident on the phase gratings 20 arranged at the grating interval P2. The grating interval P2 is so set as to satisfy the Bragg condition only for the rays having the wavelength λb. Since the phase gratings 20 have, therefore, a high reflectance of reflecting the rays of the wavelength λb, only the rays of the wavelength λb are reflected and returned along a previous optical path. The remaining rays of the wavelength λa propagate further and are incident on the launched surface 28 at the opposite side at the angle β, and a launching light 29 launches from the launched surface 28 at the angle α. Here, since the incident surface 21 and the launched surface 28 are parallel with each other, the incident light 18 and the launching light 29 of the volume phase grating 1 are parallel, but an optic-axis deviation Δ1 given by the following equation occurs.

$$\Delta 1 = T1 \times \tan \gamma / \cos \alpha$$

where T1: width of the volume phase grating 1.

Here, γ is a difference between the angles α and β and given by the following equation:

$$\gamma = \alpha - \beta$$

$$\beta = \sin^{-1}\{(\sin \alpha)/n1\}.$$

As described above, if the angles α, β are set to satisfy the above condition, the incident light 18 obliquely (at the angle α) incident on the incident surface 21 is perpendicularly incident on the phase gratings 20, and only the rays of the wavelength λb undergo Bragg reflection to return along the previous optical path. Further, since the incident light 18 is incident on the incident surface 21 at the specified angle α instead of being perpendicularly incident thereon, the light reflected by the incident surface 21 is reflected in a direction different from an incident direction of the incident light 18. Thus, a reflected light 19 by the Bragg reflection is not influenced by an end-face reflection 27 at the incident surface 21 of the volume phase grating 1, wherefore only the rays of the wavelength λb can be returned along the previous optical path.

If a refractive index n1 of the volume phase grating 1 lies within a range of 1.5 to 2.0, the angle β has a relationship of α>β>γ.

Figure 2:
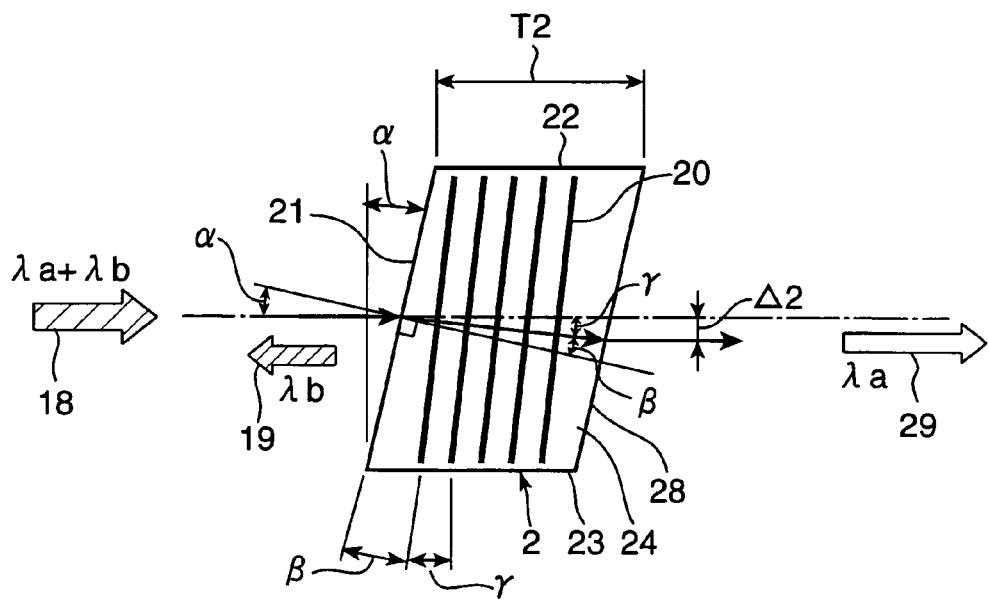
FIG. 2 is a section of a volume phase grating according to another embodiment of the invention.

FIG. 2 is a diagram showing a volume phase grating 2 cut to have a parallelogramatic shape when viewed from the side surface of a substrate 24 instead of the volume phase grating 1 shown in FIGS. 1A and 1B. Specifically, the substrate 24 is formed such that an incident surface 21 and a launched surface 28, and an upper surface (front surface) 22 and a lower surface (rear surface) 23 face each other in parallel, and the incident surface 21 and the launched surface 28 are oblique to the upper surface (front surface) 22 and the lower surface (rear surface) 23. In this volume phase grating 2, an angle of the surfaces of phase gratings 20 for causing a cyclic change of the refractive index to the upper surface 22 is γ. An optic-axis deviation Δ2 between an incident light 18 and a launching light 29 in this case is given by the following equation:

$$\Delta 2 = T2 \times \tan \gamma$$

wherein T2: width of the volume phase grating 2.

In this case, the volume phase grating 2 can be placed on a mounting substrate as it is without being inclined.

Figure 7A:
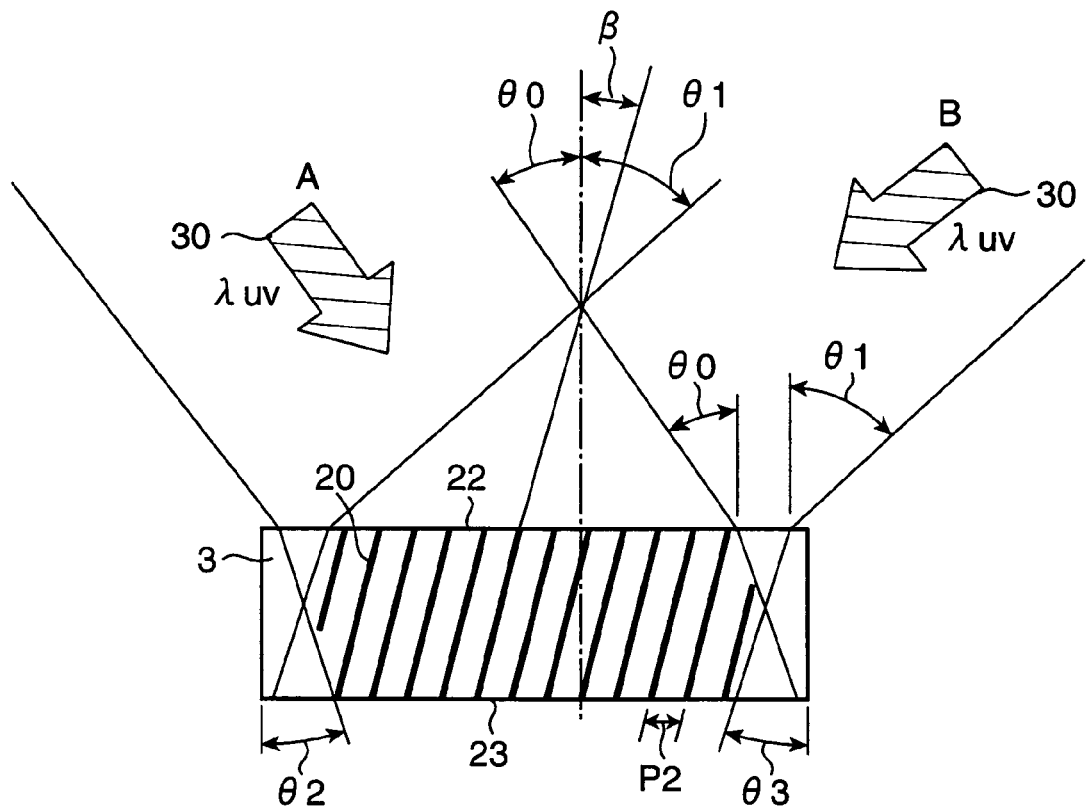
FIG. 7A is a construction diagram showing a method for producing the inventive volume phase grating by an optical interference method.

FIG. 7A shows a method for producing the inventive volume phase gratings 1, 2 shown in FIGS. 1A, 1B and 2.

First, a substrate 3 for phase gratings (material obtained by adding silver, Na, K or the like to a glass plate mainly containing $SiO_2$) is prepared, an upper surface 22 of this substrate 3 is polished into a flat surface through which light can transmit, and the resulting substrate 3 is fixed to a substrate holder (not shown). It should be noted that the upper surface 22 and a lower surface 23 of this substrate 3 are parallel with each other.

Then, recording lights 30 having a wavelength λuv are incident on the upper surface of the phase grating substrate 3 at an angle θ0 in direction A which is an oblique direction to a normal to the upper surface 22 from left side in FIG. 7A and at an angle θ1 in direction B which is an oblique direction to the above normal from right side in FIG. 7A, whereby ultraviolet rays, which are plane waves having an equal intensity, are projected for a specified period (several tens seconds to several tens minutes) to cause an optical interference in the phase grating substrate 3 for exposure recording.

Here, refracting angles θ2, θ3 in the medium of the recording lights 30 incident at the angle θ0, θ1 in both directions A, B are given by the following equations in accordance with Snell laws of refraction if the refractive index of air is n0 (n0=1) and the refractive index of the phase grating substrate 3 is n1:

$$\theta 2 = \sin^{-1}\{(\sin \theta 0)/n1\}$$

$$\theta 3 = \sin^{-1}\{(\sin \theta 1)/n1\}.$$

A wavelength λm of the recording lights 30 in the phase grating substrate 3 is given by:

$$\lambda m = \lambda uv/n1.$$

At this time, the angle β in FIG. 2 is:

$$\beta = |(\theta 2 - \theta 3)/2| (\theta 2 > \theta 3).$$

Next, the exposure-recorded phase grating substrate 3 is placed in an electric oven and heated at a temperature of about 500° C. As a result, a plurality of phase gratings 20 are formed one after another along longitudinal direction (optic-axis direction). Specifically, portions having not been exposed to the ultraviolet rays come to possess a refractive index smaller than that of the phase gratings 20 formed upon being exposed to the ultraviolet rays. Thus, areas having a smaller refractive index and those having a larger refractive index are alternately formed one after another along longitudinal direction, causing a cyclic sinuous change of the refractive index. In the case that the phase grating substrate 3 is a $SiO_2$ substrate, it is known to have a larger change of the refractive index by applying pressure to the phase grating substrate 3 by hydrogen or the like before the ultraviolet rays are projected. Thus, such a processing may be applied if necessary.

In the phase grating substrate 3 processed as above, the grating cyclic interval P2 of the phase gratings 20 for causing a cyclic change of the refractive index is given by the following equation:

$$P2=\lambda m/[2\times\sin\{(\theta 2+\theta 3)/2\}].$$

Figure 7B:
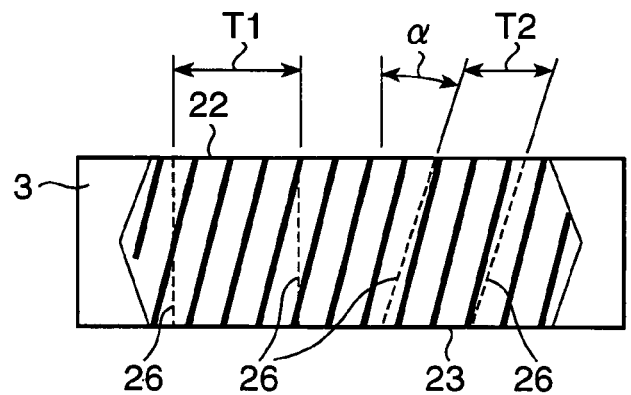
FIG. 7B is a construction diagram showing conditions on cutting a substrate for volume phase grating to obtain the volume phase gratings shown in FIGS. 1 and 2.

Next, as shown in FIG. 7B, the phase grating substrate 3 formed with a plurality of phase gratings 20 is so vertically cut as to have a width T1. In this way, the volume phase grating 1 having one cut surface 26 serving as the incident surface 21 for the light and the other cut surface 26 serving as the launched surface 28 for the light and shown in FIG. 1 can be obtained as shown at left side in FIG. 7C. Further, if the phase grating substrate 3 is so obliquely cut at the angle α to vertical direction as to have a width T2 as also shown in FIG. 7B, the volume phase grating 2 having one cut surface 26 serving as the incident surface 21 for the light and the other cut surface 26 serving as the launched surface 28 for the light and shown in FIG. 2 can be obtained as shown at right side in FIG. 7B.

The number of the phase gratings 20 is determined by the width T1, T2, and the diffraction efficiency is set according to the number of the phase gratings 20. Specifically, the smaller the width T1, T2, the smaller number of the phase gratings 20, the smaller the diffraction efficiency, and the smaller the reflectance. In the case of using the volume phase grating as an external resonator for a semiconductor laser, the diffraction efficiency of about 10% is sufficient and the width T1, T2 can be smaller. However, in the case of using the volume phase grating as an add-drop filter for WDM transmission, the diffraction efficiency needs to approximate to 100%. Thus, the widths T1, T2 are larger as compared to the case of using the volume phase grating as an external resonator for a semiconductor laser. Normally, the widths T1, T2 are about 1 mm in the case of using the volume phase grating as an external resonator for a semiconductor laser while being about 4 to 5 mm in the case of using the volume phase grating as an add-drop filter for WDM transmission.

Next, the cut surfaces 26 of the volume phase gratings 1, 2 thus obtained are optically polished. In the case of spatially independently using the volume phase gratings 1, 2, AR coating is applied by forming a dielectric multilayer film or the like to prevent the reflection at the end surfaces after the optical polishing. The inventive volume phase gratings 1, 2 produced by the above process can be applied to various kinds of optical modules.

Figure 3A:
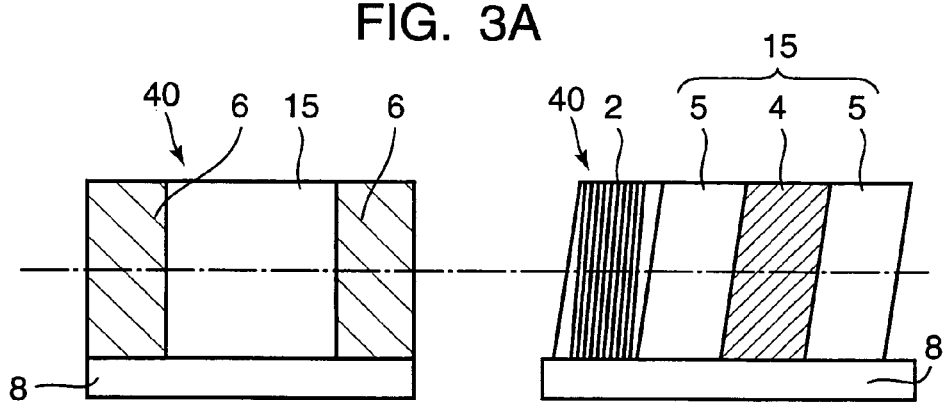
FIG. 3A is a section of an optical module in which an optical isolator is coupled to the volume phase grating shown in FIG. 2.
Figure 3B:
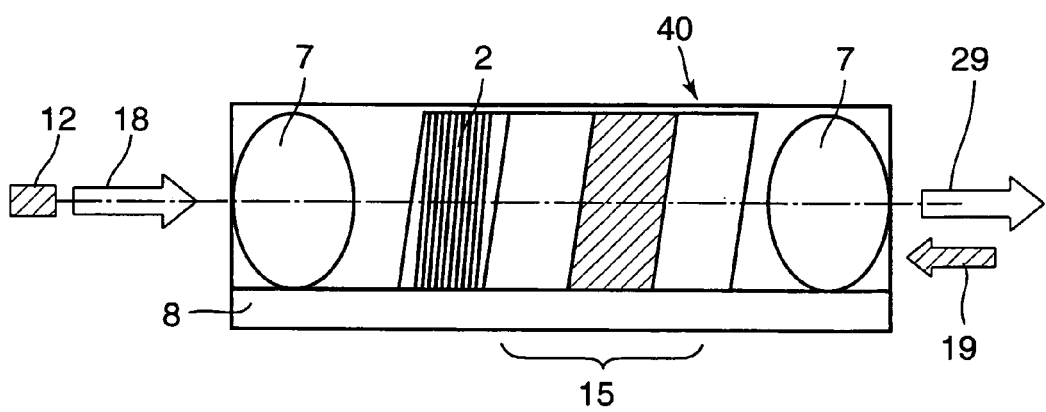
FIG. 3B is a section of an optical module constructed by arranging coupling lenses at the opposite ends of the optical module shown in FIG. 3A.

FIGS. 3A and 3B show an optical isolator module 40 constructed by mounting the inventive volume phase grating 2 shown in FIG. 2 at one side of an optical isolator 15. In this optical isolator module 40, the optical isolator 15 is arranged at the side of the launched surface 28 of the volume phase grating 2, and the volume phase grating 2 is placed such that the side of the incident surface 21 of the volume phase grating 2 faces a launching side of an unillustrated semiconductor laser diode. This optical isolator module 40 is designed to transmit lights emitted from the semiconductor laser diode and having wavelengths within a wavelength range near the wavelength of the light emitted from the semiconductor laser diode while cutting off reflected lights from the outside. This can prevent an exciting state of the semiconductor laser diode from becoming unstable. The optical isolator 15 generally has such a construction that a Faraday rotator 4 made of a garnet material is arranged between polarizers 5, and magnets 6 are arranged to apply a saturated magnetic field to the Faraday rotator 4.

Here, FIG. 3A shows the optical isolator module 40 in which the volume phase grating 2 and the optical isolator 15 are mounted and fixed together on a substrate 8, wherein the left part of FIG. 3A is a side view and the right part of FIG. 3A is a front view. Although this module 40 is constructed by putting the respective diodes together by a transparent adhesive or a glass soldering material, it may be constructed by separately fixing the respective diodes. The magnets 6 are arranged at the opposite left and right sides (front and back sides with respect to a direction normal to the optic axis in FIG. 3A) of the optical isolator 15. The magnets 6 are unnecessary if the Faraday rotator 4 used is made of a magnetic garnet material, but it does not raise any problem even if the magnets 6 are used in such a case as well.

FIG. 3B shows a construction example in which coupling lenses 7 are fixed at the opposite sides on the substrate 8 of the optical isolator module 40 shown in FIG. 3A. For example, the optical isolator module 40 is applied to a semiconductor laser module 16 shown in FIG. 6A. Specifically, the optical isolator module 40 provided with the coupling lenses 7 is placed in a casing of the semiconductor laser module 16 such that the side of the volume phase grating 2 faces the semiconductor laser diode 12 and is fixed to the substrate 8 on a Peltier diode 50. The Bragg reflection wavelength of the volume phase grating 2 is set within the spectral width of the oscillating wavelength of the semiconductor laser diode 12. By taking such a construction, the light emitted from the semiconductor laser diode 12 is converted into a parallel light by the coupling lens 7 and then first incident on the volume phase grating 2. At this time, a part (about 10% of an output) of the light emitted from the semiconductor laser diode 12 is reflected Since the optical isolator module 40 is placed on the Peltier diode 50 similar to the semiconductor laser diode 12 to have the temperature controlled in this construction example, the changing cycle of the refractive index of the volume phase grating 2 is not influenced by the linear expansion due to a temperature change and the semiconductor laser diode 12 can stably oscillate even in an environment where the temperature largely changes.

In the construction example of FIG. 3B, the coupling lens 7 may be provided only at the side of the incident surface 21 of the volume phase grating 2 or only at the side of the launched surface of the optical isolator 15.

Generally, the reflectance of the volume phase grating 2 is set at about 5 to 10%, and such a volume phase grating 2 functions as an external resonator for the semiconductor laser diode 12. Then, the laser oscillates at a wavelength equal to the wavelength characteristic of the Bragg reflection light from the volume phase grating 2, and can oscillate with a stable spectrum characteristic within such a range.

Figure 6A:
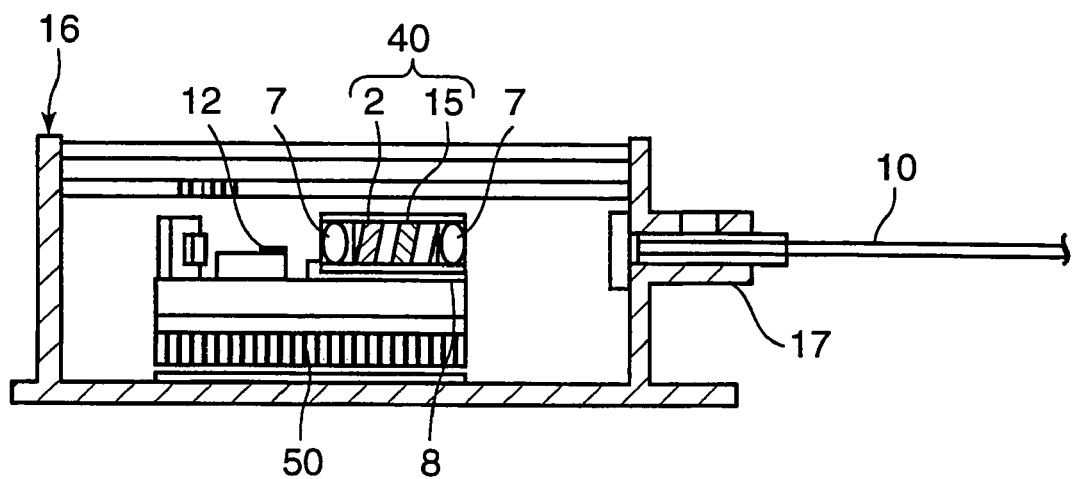
FIG. 6A is a section showing an essential portion of a semiconductor laser module having an optical module including the inventive volume phase grating and an optical isolator mounted inside.
Figure 6B:
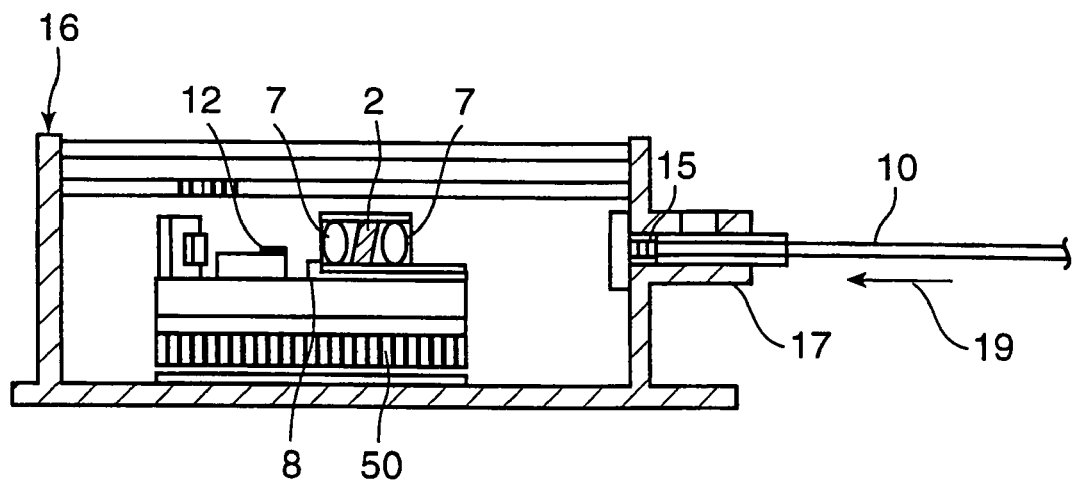
FIG. 6B is a section showing an essential portion of a semiconductor laser module having an optical module including the inventive volume phase grating and a coupling lens mounted inside.

The semiconductor laser module 16 may also be constructed by placing an optical module (see FIG. 4 to be described for detail), in which the coupling lenses 7 are fixed at the opposite sides of the volume phase grating 2, on the Peltier diode 50 similar to the semiconductor laser diode 12 as shown in FIG. 6B. Even in such a case, since the temperature is controlled, the changing cycle of the refractive index of the volume phase grating 2 is not influenced by the linear expansion due to a temperature change and the semiconductor laser diode 12 can stably oscillate even in an environment where the temperature largely changes.

However, the semiconductor laser module shown in FIG. 6B is not preferably in use for the following reason. If unnecessary reflected lights 19 from outside, particularly reflected lights 19 within the wavelength range near the oscillating wavelength of the semiconductor laser diode 12 return to the semiconductor laser diode 12 via an output side fiber end 17, the oscillation becomes unstable due to the influence of such reflected lights 19 and the output-wavelength spectrum characteristic becomes unstable. Thus, the optical isolator 15 as shown in FIG. 3A may be mounted on the output-side fiber end 17 while being separated from the volume phase grating 2. As a result, the reflected lights 19 can be eliminated from an optical fiber 10.

Since the optical isolator 15 cuts of f the unnecessary reflected lights 19 from outside in the semiconductor laser module 16 shown in FIG. 6A, the oscillation of the semiconductor laser diode 12 is not influenced by such lights at all.

Figure 11:
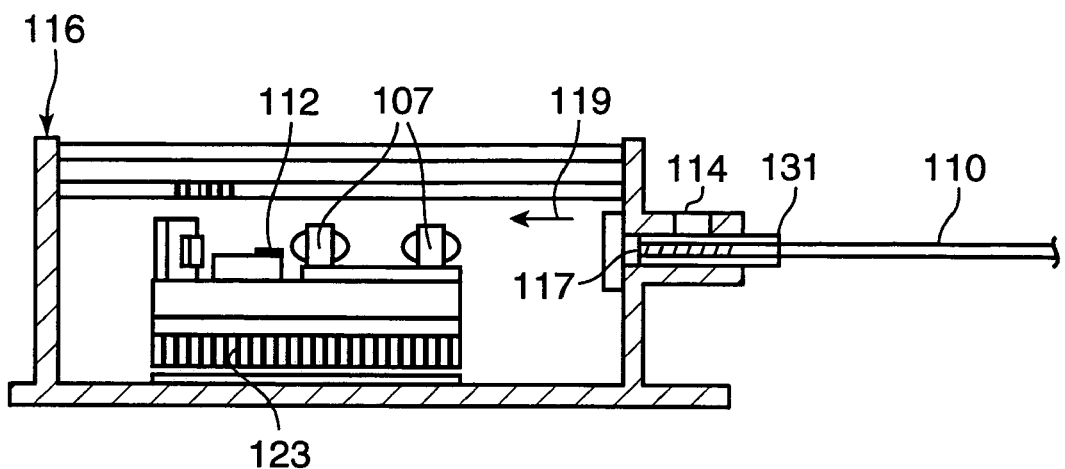
FIG. 11 is a section of a conventional semiconductor laser module provided with the FBG.
Figure 12:
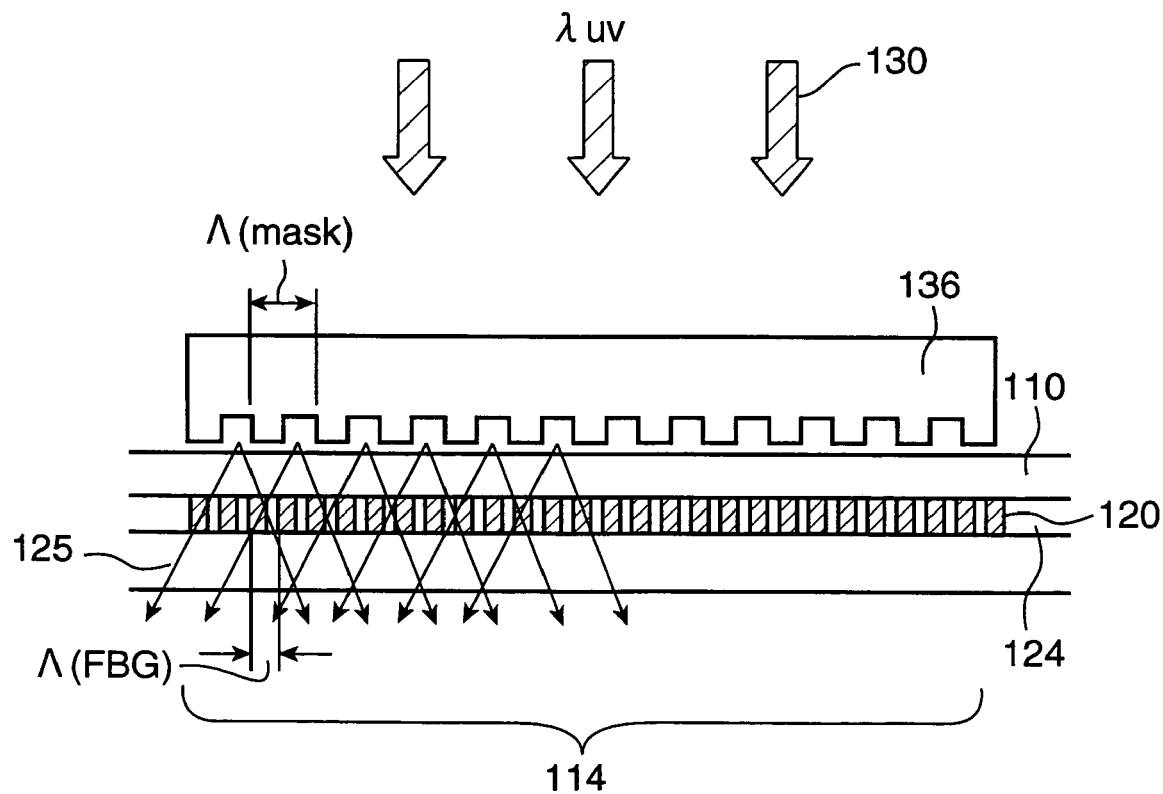
FIG. 12 is a diagram showing a conventional method for producing the FBG.

On the other hand, in the prior art semiconductor laser module 116 provided with the FBG shown in FIG. 11, the FBG 114 is provided at the output-side fiber end 117 covered by a ferrule 131 and is likely to be influenced by an ambient temperature change. Further, the reflected light 119 from the fiber 110 is incident on the semiconductor laser diode 112 via a plurality of phase gratings 120 formed in the FBG 114. Particularly, if the reflected light 119 whose wavelength lies within the wavelength range near the oscillating wavelength of the semiconductor laser diode 112 returns to the semiconductor laser diode 112, the oscillation becomes unstable and the output-wavelength spectrum characteristic is disturbed without being stabilized.

Particularly, in the case of using the semiconductor laser module as an excitation light source for an optical fiber amplifier for DWM transmission, higher outputs, wavelength multiplexing and polarization multiplexing are required. To this end, the oscillating wavelength needs to be stabilized and the spectral width needs to be narrowed. Thus, the semiconductor laser modules using the aforementioned volume phase gratings 1, 2 according to the present invention are effective.

Figure 4:
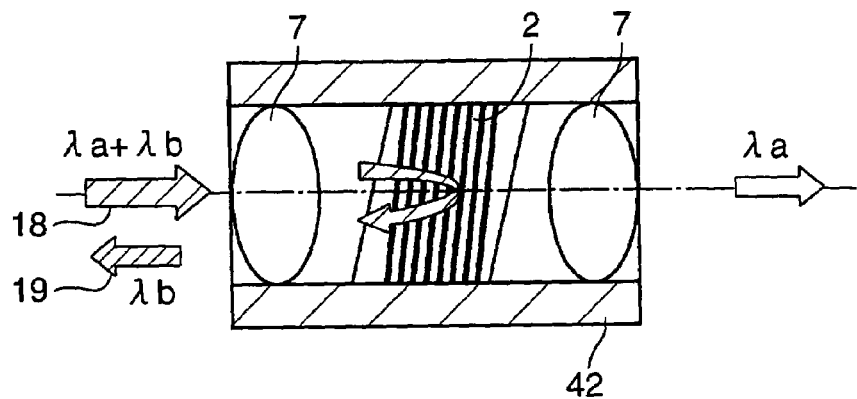
FIG. 4 is a section of an optical module constructed by arranging coupling lenses at the opposite ends of the volume phase grating according to the invention.

FIG. 4 is a diagram of an optical module in which the inventive volume phase grating 2 is arranged in a tubular container 42 and the opposite ends of the volume phase grating 2 are optically coupled by coupling lenses 7 in the container 42. As described above, this optical module is used by being arranged at the launched side of the semiconductor laser diode 12 shown in FIG. 6B and reflects a part of the incident light 18 by diffraction, thereby acting as an external resonator. Thus, the oscillating wavelength of the semiconductor laser diode 12 can be stabilized. It should be noted that the coupling lens 7 may be arranged only at the side of the launched surface 28 of the volume phase grating 2 or only at the side of the incident surface 21 thereof.

Figure 5A:
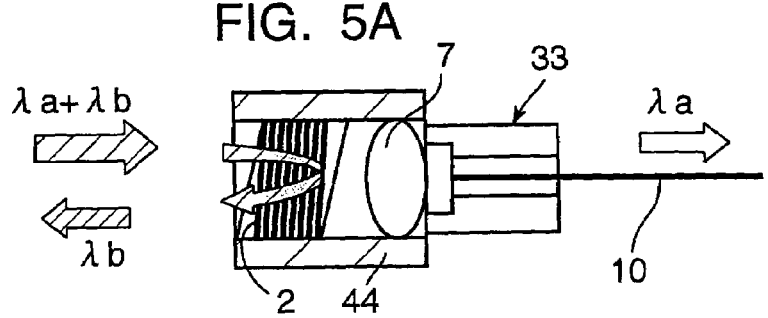
FIG. 5A is a diagram showing one embodiment of a pigtail type optical module having the inventive volume phase grating mounted inside.
Figure 5B:
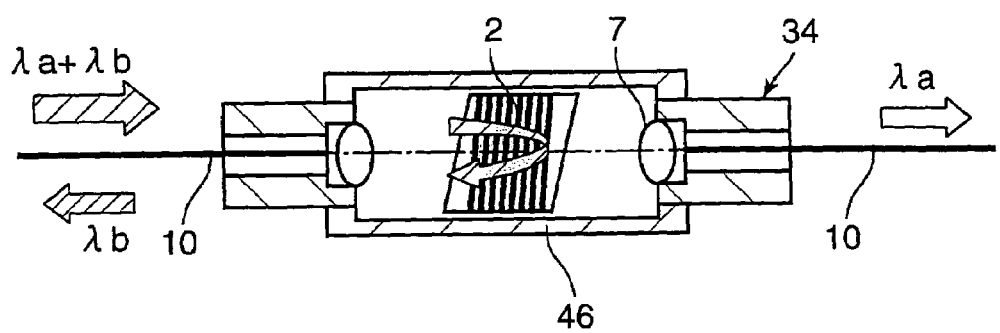
FIG. 5B is a diagram showing another embodiment of the inline type optical module having the inventive volume phase grating mounted inside.

FIG. 5A is a diagram showing a construction example of a fiber collimator 33 as an optical module in which the volume phase grating 2 is mounted in a tubular container 44 together with a coupling lens 7 arranged at one side of the volume phase grating 2 for optical coupling, and FIG. 5B is a diagram showing a construction example of an inline-type optical module 34 as an optical module in which the volume phase grating 2 is mounted in a tubular container 46 together with coupling lenses 7 arranged at the opposite ends of the volume phase grating 2 for optical coupling.

These optical modules are used as band-pass filters for reflecting rays of a specified wavelength corresponding to a refractive index change of the volume phase grating 2 when a light having a plurality of wavelengths is incident thereon. As compared to FBG-type band-pass filters, these band-pass filters have a shorter length of 2 to 3 mm, undergo a smaller linear expansion upon a temperature change and hardly experience a variation of the grating interval. Thus, they have a more stable property against a temperature change as compared with those of the FBG type and enable a miniaturized mount construction.

Figure 5C:
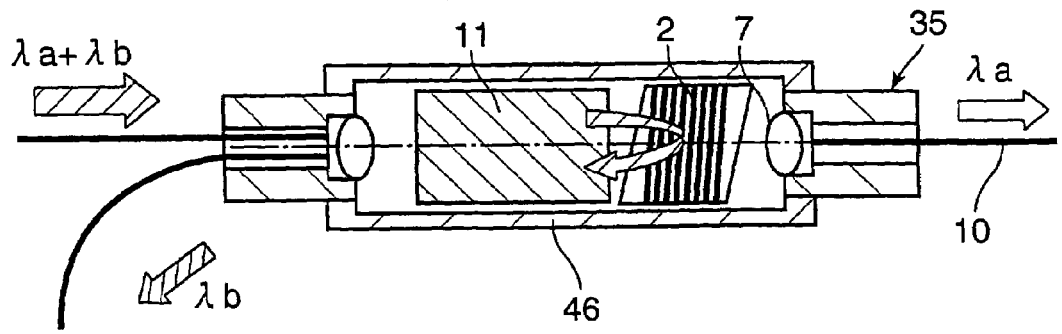
FIG. 5C is a diagram showing one embodiment of an inline type optical module having the inventive volume phase grating mounted inside together with an optical circulator.

FIG. 5C is a diagram showing a construction example of an optical circulator 35 obtained by further arranging an optical circulator diode 11 in the construction example shown in FIG. 5B. In this optical circulator 35, the FBG 14 needs not be separately mounted to form an add-drop circuit unlike the prior art. Further, the optical circulator 35 can be so constructed as to have a stable temperature characteristic. The inventive volume phase grating 2 is not restrictively applied to the above and can be applied to an optical module of any form.

EXAMPLES

Figure 7C:
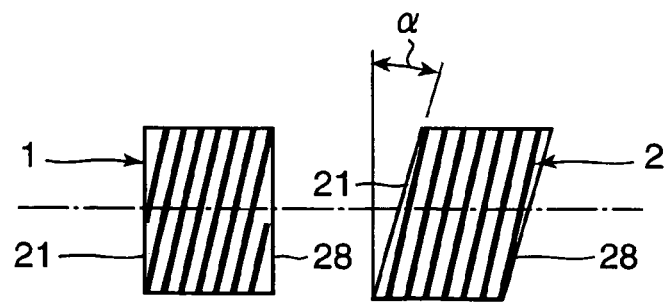
FIG. 7C is a construction diagram of the volume phase gratings according to the embodiments shown in FIGS. 1 and 2.

Next, a specific example in the case of producing the inventive volume phase grating 1 shown in FIG. 1A according to the process described with reference to FIGS. 7A, 7B and 7C is described.

First, the phase grating substrate 3 (refractive index n1=1.525) of FIG. 7A having the upper and lower surfaces optically polished, having a diameter of 2 inches and a thickness of 2 mm and made of a photoinduced refractive index material mainly containing $SiO_2$ was prepared. A water-cooling type argon laser having a wavelength of 488 nm and an output of 3 W was used as a coherent light source. The argon laser and an optical system for interference exposure were placed on a vibration-proof table, a light emitted from the laser was so split by a beam splitter as to have an equal intensity, and the respective beams passed through a lens had unnecessary diffracted rays eliminated by a pinhole having a diameter of 10 μm and arranged at a position of convergence of the lens. The beams are made into parallel beams having an outer diameter of 35 mm (peak intensity of $1/e^2$) by a collimating optical system, and recording lights comprised of these parallel beams are projected to the phase grating substrate 3 for about 10 minutes for exposure recording in a dark room by the two-beam interference method (holographic technique) (the above process is not shown).

Angles of the respective recording lights were: $\theta 0=47°$, $\theta 1=54°$. Since $\beta=(\theta 2-\theta 3)/2$, $\theta 2=\sin^{-1}\{(\sin \theta 0)/n1\}$ and $\theta 3=\sin^{-1}\{(\sin \theta 1)/n1\}$, the angles in the phase grating substrate 3 were $\theta 2=28.7°$, $\theta 3=32°$.

In this case, the angle β of the phase gratings 20 to the incident surface 21 shown, for example, in FIG. 1A is 1.65° and the incident angle α of the incident light was set at 2.5° since $\alpha=\sin^{-1}(n1\times\sin \beta)$.

The phase grating substrate 3 subjected to the exposure recording was detached from the holder and heated at a temperature of 450° C. to 600° C. for 3 to 4 hours in an electric oven, thereby causing the refractive index of the exposed parts to decrease to create a cyclic change of the refractive index in the phase grating substrate 3. Thereafter, the phase grating substrate 3 was vertically cut such that the width T became 1 mm, had the cut surfaces 26 thereof optically polished and had dielectric multilayer films for AR coatings formed on the cut surfaces 26 by deposition. In this way, the volume phase grating 1 was produced.

The volume phase grating 1 thus obtained had the output-wavelength spectrum characteristic within a range of 1475 nm±1 nm and a reflectance of about 10%. This volume phase grating 1 was inclined at the angle α of 2.5°, had the opposite ends thereof held by the coupling lenses and was fixed to a substrate together with the coupling lenses to construct an optical module.

This optical module was fixedly mounted on a substrate on the Peltier diode 50 of the semiconductor laser module 16 including the semiconductor laser diode 12 whose oscillating wavelength was 1472 nm at 25° C.

Figure 8:
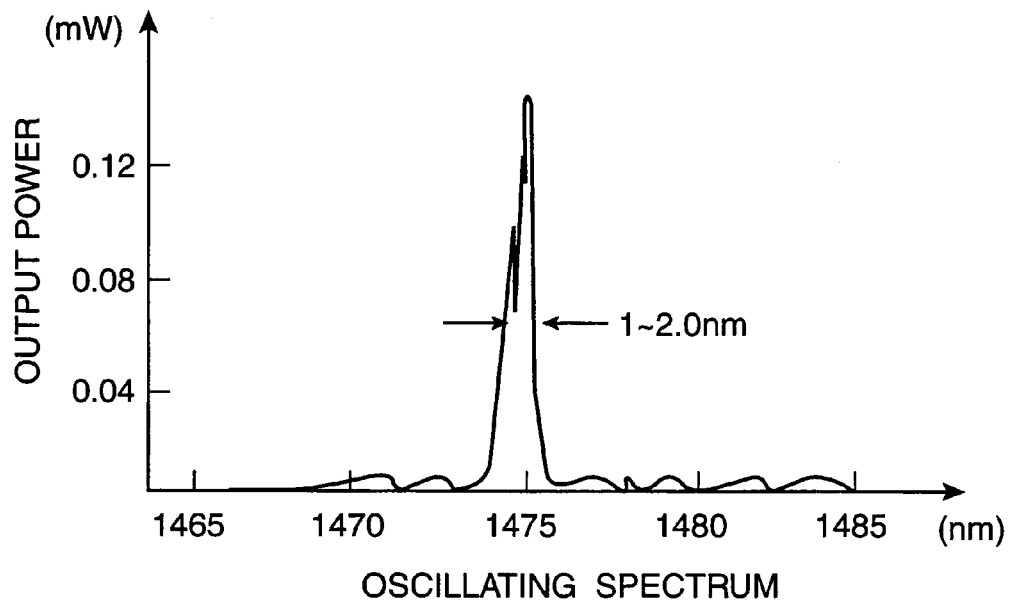
FIG. 8 is a graph showing a spectrum characteristic of an output light of a semiconductor laser module using the inventive volume phase grating.

Here, an optical fiber whose diffraction efficiency was about 10% at an output-side fiber end where the volume phase grating 1 was mounted was used, and the semiconductor laser diode having such an output spectrum characteristic as shown in FIG. 8 that the half width to a peak of the output power at an external temperate of 25° C. was about 1.5 mm was used.

Figure 9:
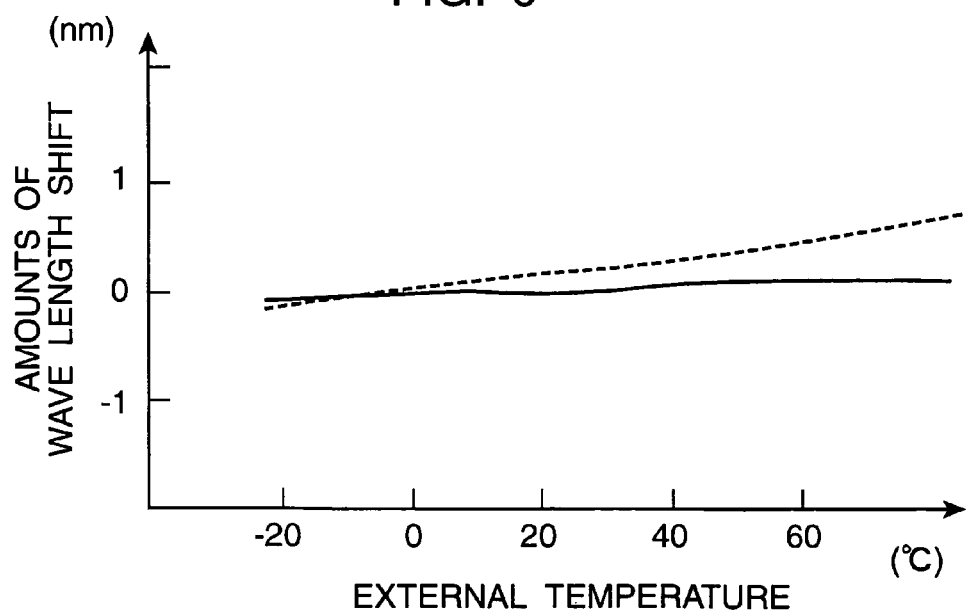
FIG. 9 is a graph showing amounts of wavelength shift in relation to an external temperature change in the semiconductor laser module using the inventive volume phase grating and in a conventional semiconductor laser module using a FBG.
Figure 10A:
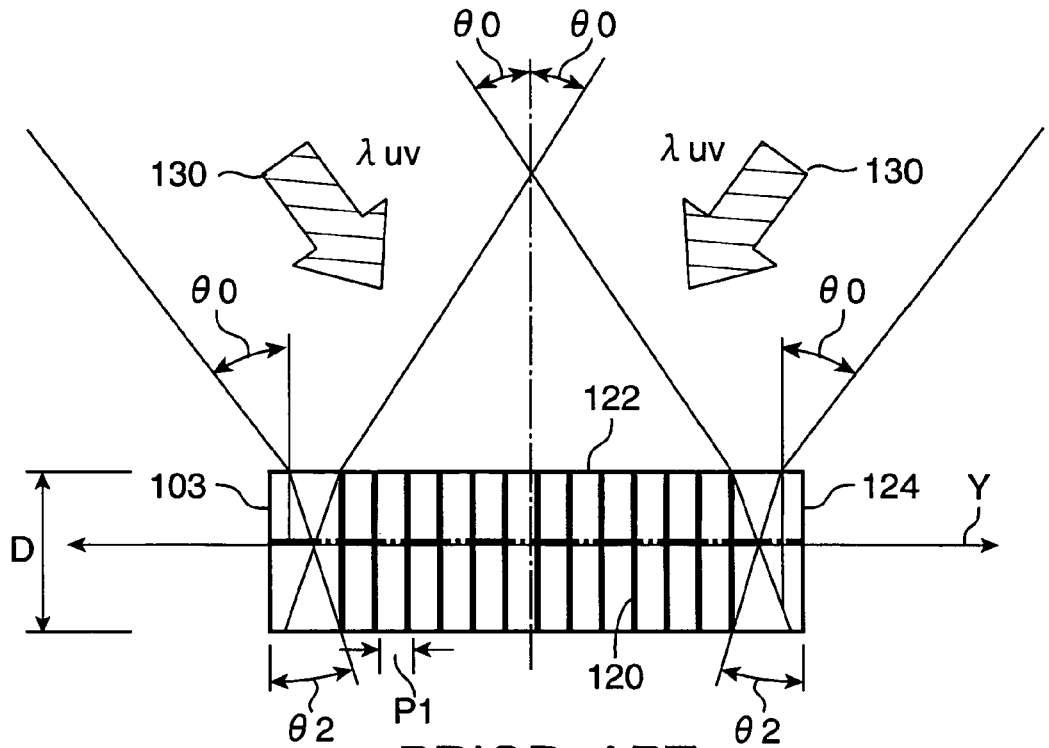
FIG. 10A is a construction diagram showing a method for producing a conventional diode for optical module by an optical interference method.
Figure 10B:
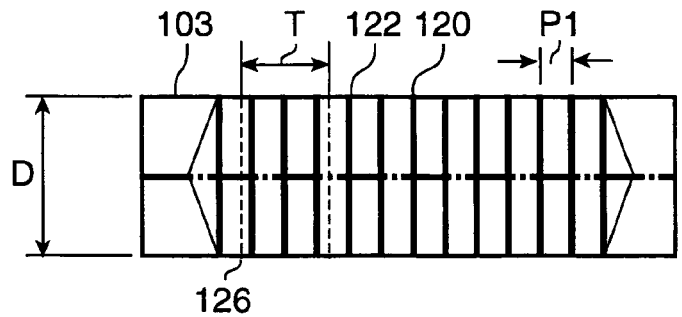
FIG. 10B is a construction diagram showing conditions on cutting the diode for optical module to obtain the conventional diodes for optical module.
Figure 10C:
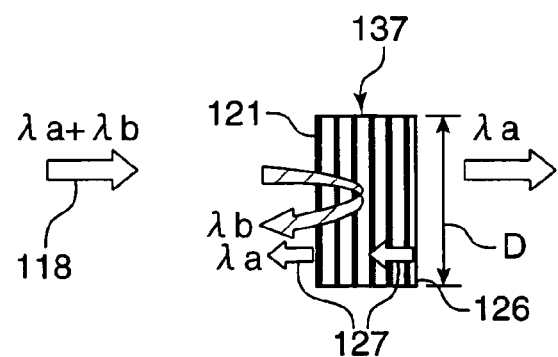
FIG. 10C is a construction diagram showing the conventional diode for optical module.

With an APC (auto power control) and a temperature control by the Peltier diode 50 applied to the semiconductor laser module thus constructed, the output power and the output spectrum characteristic of the semiconductor laser module were monitored in a temperature change condition of −20° C. to 60° C. FIG. 9 shows a shifted amount of a peak wavelength of the output power. In the case of mounting the inventive volume phase grating 1 (solid line), wavelength was hardly shifted and a stable oscillating state in which the characteristic hardly changes was obtained.

Contrary to this, in the case of using the prior art FBG (broken line), the FBG underwent a linear expansion by being influenced by the external temperature and the reflection wavelength was shifted toward a longer wavelength side since the temperature control by the APC and the Peltier diode could not be executed due to its construction. Thus, the oscillating wavelength of the semiconductor laser diode was also shifted toward the longer wavelength side.

In this way, the inventive volume phase grating 1 was actually proved to sufficiently stably function as an external resonator and realize a semiconductor laser module having stable characteristics even in a place where the temperature largely changes. It was also confirmed that, similar to the volume phase grating 1, a semiconductor laser module having stable characteristics could be realized using the volume phase grating 2 shown in FIG. 2.

As described above, the present invention concerns the volume phase grating in which a plurality of phase gratings for causing the refractive index in the substrate having the opposing incident surface and the launched surface to cyclically change between the incident surface and the launched surface are so formed as to be inclined at the specified angle to the incident surface.

With this construction, if the incident light is caused to be incident on the incident surface of the volume phase grating at the specified incident angle, the incident light refracted at the incident surface of the substrate can be perpendicularly incident on the phase gratings. Thus, it is possible not only to reflect only rays having the necessary wavelength by the phase gratings and return them toward the incident side of the incident light, but also to prevent the rays undergone the end-face reflection at the incident surface from returning toward the incident side.

In the inventive volume phase grating, the substrate may be formed such that the incident surface and the launched surface are parallel with each other.

With such a substrate, the direction of the light launched from the launched surface of the volume phase grating can coincide with the direction of the incident light on the incident surface, which is highly convenient in the case of constructing an optical module.

In the inventive volume phase grating, the substrate may have the upper and lower surfaces connecting the incident surface and the launched surface and parallel with each other.

With such a substrate, an optical module can be easily constructed by placing the lower surface of the volume phase grating on a mounting substrate.

In the inventive volume phase grating, the substrate may be formed such that the incident surface and the launched surface are oblique to the upper and lower surfaces.

With such a substrate, the incident light can be caused to be incident on the incident surface at the specified angle only by placing the lower surface of the volume phase grating on the mounting substrate without inclining the volume phase grating, with the result that an optical module can be more easily constructed.

In the inventive volume phase grating, the angle of the phase gratings to the incident surface may be set such that the incident light obliquely incident on the incident surface is refracted at the incident surface and perpendicularly incident on the phase gratings.

With such an arrangement, upon being incident on the incident surface of the volume phase grating at the specified incident angle, the incident light refracted at the incident surface can be perpendicularly incident on the phase gratings. Thus, it is possible not only to reflect only rays having the necessary wavelength by the phase gratings and return them toward the incident side of the incident light, but also to prevent the rays undergone the end-face reflection at the incident surface from returning toward the incident side.

Further, in the inventive volume phase grating, when $\beta$, $\alpha$ and n1 denote the angle of the phase gratings to the incident surface, the incident angle of the incident light obliquely incident on the incident surface and the refractive index of the substrate, the angle $\beta$ may be given by the following equation:

$$\beta = \sin^{-1}\{(\sin \alpha)/n1\}(\alpha > \beta).$$

With such setting, when the incident light is caused to be incident on the incident surface of the volume phase grating at the incident angle $\alpha$, the incident light refracted at the incident surface is perpendicularly incident on the phase gratings inclined at the angle $\beta$ to the incident surface. Thus, it is possible not only to reflect only rays having the necessary wavelength by the phase gratings and return them toward the incident side of the incident light, but also to prevent the rays undergone the end-face reflection at the incident surface from returning toward the incident side.

The present invention also concerns the optical module including the volume phase grating in which a plurality of phase gratings for causing the refractive index in the substrate having the opposing incident surface and the launched surface to cyclically change between the incident surface and the launched surface are so formed as to be inclined at the specified angle to the incident surface, and the optical component optically coupled to the volume phase grating, wherein, in the volume phase grating, the angle of the phase gratings to the incident surface is set such that the incident light obliquely incident on the incident surface is refracted at the incident surface and perpendicularly incident on the phase gratings.

With this optical module, if the incident light is caused to be incident on the incident surface of the volume phase grating at the specified incident angle, the incident light refracted at the incident surface of the substrate can be perpendicularly incident on the phase gratings. Thus, it is possible not only to reflect only rays having the necessary wavelength by the phase gratings and return them toward the incident side of the incident light, but also to prevent the rays undergone the end-face reflection at the incident surface from returning toward the incident side.

Further, in the inventive optical module, when β, α and n1 denote the angle of the phase gratings to the incident surface, the incident angle of the incident light obliquely incident on the incident surface and the refractive index of the substrate, the angle β may be given by the following equation:

$$\beta = \sin^{-1}\{(\sin \alpha)/n1\} \, (\alpha > \beta).$$

With such setting, when the incident light is caused to be incident on the incident surface of the volume phase grating at the incident angle α, the incident light refracted at the incident surface is perpendicularly incident on the phase gratings inclined at the angle β to the incident surface. Thus, it is possible not only to reflect only rays having the necessary wavelength by the phase gratings and return them toward the incident side of the incident light, but also to prevent the rays undergone the end-face reflection at the incident surface from returning toward the incident side.

In the inventive optical module, the optical isolator may be arranged at the launched-surface side of the volume phase grating.

With this arrangement, the light having the specified wavelength can be passed through the volume phase grating and the optical isolator, and the unnecessary reflected light from the outside can be cut off by the isolator, thereby preventing this unnecessary reflected light from returning to the incident-surface side of the volume phase grating. Thus, the optical module functioning as an external resonator and having a good performance can be realized.

Further, in the inventive optical module, the coupling lens may be arranged at the incident-surface side of the volume phase grating in addition to the optical isolator arranged at the launched-surface side of the volume phase grating.

With this arrangement, the light having the specified wavelength can be passed through the volume phase grating and the optical isolator, and the unnecessary reflected light from the outside can be cut off by the isolator, thereby preventing this unnecessary reflected light from returning to the incident-surface side of the volume phase grating. In addition, the incident light having a wide span can be gathered and caused to be incident on the incident surface of the volume phase grating. Thus, the optical module functioning as an external resonator and having a good performance can be realized.

Further, in the inventive optical module, the coupling lens may be arranged at the launched-surface side of the optical isolator in addition to the one arranged at the incident-surface side of the volume phase grating.

With this arrangement, the light having the specified wavelength can be passed through the volume phase grating and the optical isolator, and the unnecessary reflected light from the outside can be cut off by the isolator, thereby preventing this unnecessary reflected light from returning to the incident-surface side of the volume phase grating. In addition, the light having a wide span and launching from the optical isolator can be gathered and caused to launch to the outside. Thus, the optical module functioning as an external resonator and having a good performance can be realized.

In the inventive optical module, the coupling lens may be arranged at the launched-surface side of the volume phase grating.

With this arrangement, the light launched from the volume phase grating can be gather and caused to launch to the outside.

In the inventive optical module, the coupling lens may be arranged at the incident-surface side of the volume phase grating in addition to the one arranged at the launched-surface side of the volume phase grating.

With this arrangement, the launching light having passed through the volume phase grating can be gathered and caused to launch to the outside, and the incident light having a wide space can be gathered and caused to be incident on the incident surface of the volume phase grating.

In the inventive optical module, the optical circulator may be arranged at the incident-surface side of the volume phase grating.

With this arrangement, the unnecessary light reflected by the volume phase grating can be cut off by the optical circulator, thereby preventing the unnecessary reflected light from returning toward the incident side of the incident light. Thus, the optical module functioning as an external resonator and having a good performance can be realized.

In the inventive optical module, the coupling lenses may be arranged at the incident-surface side of the optical circulator and at the launched-surface side of the volume phase grating.

With this arrangement, the incident light can be gathered and caused to be incident on the optical circulator, and the light passed through the optical circulator and the volume phase grating can be gathered and caused to launch to the outside. Thus, the optical module functioning as an external resonator and having a good performance can be realized.

The present invention also concerns the semiconductor laser module including the optical module using the volume phase grating in which a plurality of phase gratings for causing the refractive index in the substrate having the opposing incident surface and the launched surface to cyclically change between the incident surface and the launched surface are so formed as to be inclined at the specified angle to the incident surface, and the semiconductor laser diode arranged at the incident-surface side of the volume phase grating of the optical module.

With this semiconductor laser module, since it is possible not only to reflect only rays having the necessary wavelength by the phase gratings and return them toward the incident side of the incident light, but also to prevent the rays undergone the end-face reflection at the incident surface from returning toward the incident side, the oscillating wavelength of the semiconductor laser diode can be stabilized and the semiconductor laser module having a good performance can be realized.

The present invention further concerns the method for producing the volume phase grating in which a plurality of phase gratings for causing the refractive index in the substrate having the opposing incident surface and the launched surface to cyclically change between the incident surface and the launched surface are so formed as to be inclined at the specified angle to the incident surface, the method comprises a step of preparing a base substrate for forming a plurality of volume phase gratings and a step of projecting ultraviolet rays having an aligned phase to the outer surface of the prepared base substrate in two directions having different incident angles, thereby forming a plurality of phase gratings inclined to the normal to the outer surface of the base substrate inside the base substrate.

According to this method, a plurality of phase gratings inclined to the normal to the outer surface of the base substrate can be formed inside the base substrate by projecting the ultraviolet rays to the outer surface of the base substrate in the two directions having different incident angles. Thus, the volume phase grating for causing a cyclic change of the refractive index between the incident and launched surfaces can be easily and securely produced.

According to the inventive method, when θ0, θ1 denote the incident angles of the ultraviolet rays in the two directions, θ2 denotes the incident angle inside the base substrate of the ultraviolet rays incident at the incident angle θ0, θ3 denotes the incident angle inside the base substrate of the ultraviolet rays incident at the incident angle θ1, β denote the angle of inclination of the phase gratings to the normal to the outer surface of the base substrate, and n1 denotes the refractive index of the base substrate, the angle of inclination β and the angles θ2, θ3 may be given by the following equations:

$$\beta = |(\theta 2 - 3)|/2$$

$$\theta 2 = \sin^{-1}\{\sin \theta 0)/n1\}$$

$$\theta 3 = \sin^{-1}\{\sin \theta 1)/n1\}$$

With such setting, a plurality of phase gratings inclined at the angle β to the normal to the outer surface of the base substrate can be formed inside the base substrate by projecting the ultraviolet rays in two directions at the incident angles θ0, θ1 to the outer surface of the base substrate. Thus, the volume phase grating for causing a cyclic change of the refractive index between the incident and launched surfaces can be easily and securely produced.

The inventive method may further comprise a step of forming the phase gratings inside the base substrate by heating the base substrate having the ultraviolet rays projected thereto.

According to this method, the phase gratings can be securely formed inside the base substrate by heating the base substrate having the ultraviolet rays projected thereto.

The inventive method may further comprise a step of obtaining a plurality of element substrates by cutting the base substrate formed with the phase gratings at a specified angle to the normal to the outer surface, a step of polishing the cut surfaces of the element substrates, and a step of forming an anti-reflection film on the polished cut surface of the element substrate to make it the incident surface for the incident light.

According to this method, the end-face reflection of the incident light at the incident surface can be effectively reduced by forming the anti-reflection film after polishing the cut surface of the element substrate obtained by cutting the base substrate.

This application is based on patent application No. 2002-377393 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A volume phase grating, comprising:
   a substrate having an incident surface and a launched surface facing each other, and
   a plurality of phase gratings for causing a cyclic change of a refractive index between the incident surface and the launched surface, the phase gratings being so formed as to be inclined at a specified angle to the incident surface, and
   wherein an angle of the phase gratings to the incident surface is set such that an incident light obliquely incident on the incident surface is retracted at the incident surface and perpendicularly incident on the phase gratings.

2. A volume phase grating according to claim 1, wherein the substrate is formed such that the incident surface and the launched surface are parallel with each other.

3. A volume phase grating according to claim 2, wherein the substrate has an upper surface and a lower surface parallel with each other and connecting the incident surface and the launched surface.

4. A volume phase grating according to claim 3, wherein the substrate is formed such that the incident surface and the launched surface are oblique to the upper and lower surfaces.

5. A volume phase grating according to claim 1, wherein, when β, α and n1 denote the angle of the phase gratings to the incident surface, an incident angle of the incident light obliquely incident on the incident surface and the refractive index of the substrate, the angle β is given by an equation:

$$\beta = \sin^{-1}\{(\sin \alpha)/n1\}(\alpha > \beta).$$

6. An optical module, comprising:
   the volume phase grating according to claim 1; and
   an optical component optically coupled to the volume phase grating,
   wherein, in the volume phase grating, an angle of the phase gratings to the incident surface is set such that an incident light obliquely incident on the incident surface is refracted at the incident surface and perpendicularly incident on the phase gratings.

7. An optical module according to claim 6, wherein, when β, α and n1 denote the angle of the phase gratings to the incident surface, an incident angle of the incident light obliquely incident on the incident surface and the refractive index of the substrate, the angle β is given by an equation:

$$\beta = \sin^{-1}\{(\sin \alpha)/n1\}(\alpha > \beta).$$

8. An optical module according to claim 7, wherein an optical isolator is arranged at a launched-surface side of the volume phase grating.

9. An optical module according to claim 8, wherein a coupling lens is arranged at an incident-surface side of the volume phase grating.

10. An optical module according to claim 9, wherein a coupling lens is arranged at a launched-surface side of the optical isolator.

11. An optical module according to claim 7, wherein a coupling lens is arranged at a launched-surface side of the volume phase grating.

12. An optical module according to claim 11, wherein a coupling lens is arranged at an incident-surface side of the volume phase grating.

13. An optical module according to claim 7, wherein an optical circulator is arranged at an incident-surface side of the volume phase grating.

14. An optical module according to claim 13, wherein coupling lenses are arranged at an incident-surface side of the optical circulator and at a launched-surface side of the volume phase grating.

15. A semiconductor laser module, comprising:
   an optical module including the volume phase grating according to claim 1; and
   a semiconductor laser element arranged at an incident-surface side of the volume phase grating in the optical module.

* * * * *